US012675950B2

(12) United States Patent
Sokolova et al.

(10) Patent No.: US 12,675,950 B2
(45) Date of Patent: Jul. 7, 2026

(54) METHOD AND AN ELECTRONIC DEVICE FOR 3D SCENE RECONSTRUCTION AND VISUALIZATION

(71) Applicant: SAMSUNG ELECTRONICS CO., LTD., Suwon-si (KR)

(72) Inventors: Anna Ilyinichna Sokolova, Moscow (RU); Anna Borisovna Vorontsova, Moscow (RU); Alexander Georgievich Limonov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 18/629,613

(22) Filed: Apr. 8, 2024

(65) Prior Publication Data

US 2024/0346765 A1 Oct. 17, 2024

Related U.S. Application Data

(63) Continuation of application No. PCT/KR2024/004183, filed on Apr. 1, 2024.

(30) Foreign Application Priority Data

Apr. 13, 2023 (RU) ................................ 2023109346
Aug. 24, 2023 (RU) ................................ 2023122047

(51) Int. Cl.
*G06T 17/20* (2006.01)
*G06T 7/11* (2017.01)
*G06V 10/74* (2022.01)

(52) U.S. Cl.
CPC ................ *G06T 17/20* (2013.01); *G06T 7/11* (2017.01); *G06V 10/761* (2022.01); *G06T 2207/20081* (2013.01); *G06T 2207/20084* (2013.01)

(58) Field of Classification Search
CPC ......... G06V 10/761; G06T 7/11; G06T 17/20; G06T 17/00; G06T 2207/20084; G06T 2207/20081
(Continued)

(56) References Cited

U.S. PATENT DOCUMENTS 8,587,583 B2 11/2013 Newcombe et al.
9,076,250 B2 7/2015 Kim et al.
(Continued)

FOREIGN PATENT DOCUMENTS

CN 108230337 A 6/2018
JP 7553266 B2 9/2024
(Continued)

OTHER PUBLICATIONS

Zhou L, Wu G, Zuo Y, Chen X, Hu H. A comprehensive review of vision-based 3d reconstruction methods. Sensors. Apr. 5, 2024;24(7):2314.*
(Continued)

*Primary Examiner* — Phu K Nguyen
(74) *Attorney, Agent, or Firm* — Sughrue Mion, PLLC

(57) ABSTRACT

A method for 3D scene reconstruction and visualization, may include, using at least one processor: obtaining a trained base neural network by training the base neural network for obtaining distance information for voxels of a real scene; operating the trained base neural network for obtaining the distance information of an input sequence of frames of the real scene; inputting the distance information to an algorithm that outputs a 3D reconstruction of the real scene; obtaining a 3D visualization of the real scene by rendering the 3D reconstruction of the real scene; and instructing at least one display to display the 3D visualization of the real scene.

20 Claims, 4 Drawing Sheets

(58) Field of Classification Search

USPC .......................................................... 345/418

See application file for complete search history.

(56) References Cited

U.S. PATENT DOCUMENTS

| | | | | |
|---|---|---|---|---|
| 9,978,177 | B2 * | 5/2018 | Mehr ...................... G06T 7/194 |
| 11,170,246 | B2 | 11/2021 | Ono et al. | |
| 11,188,787 | B1 | 11/2021 | Ulbricht et al. | |
| 2018/0018805 | A1 * | 1/2018 | Kutliroff ............... G06V 20/20 |
| 2019/0043203 | A1 | 2/2019 | Fleishman et al. | |
| 2020/0342674 | A1 * | 10/2020 | Chen ......................... G06T 7/50 |
| 2020/0356899 | A1 | 11/2020 | Rejeb Sfar et al. | |
| 2021/0279950 | A1 * | 9/2021 | Phalak ................... G06F 18/231 |
| 2021/0390741 | A1 | 12/2021 | Zhang et al. | |
| 2022/0366635 | A1 | 11/2022 | Murez | |
| 2022/0375164 | A1 | 11/2022 | Chen | |
| 2023/0086928 | A1 | 3/2023 | Fang et al. | |
| 2023/0094308 | A1 | 3/2023 | Yang et al. | |
| 2023/0360241 | A1 * | 11/2023 | Sayed ..................... G06T 17/00 |

FOREIGN PATENT DOCUMENTS

| | | |
|---|---|---|
| KR | 10-1839035 B1 | 3/2018 |
| KR | 10-2483354 B1 | 12/2022 |
| KR | 10-2757806 B1 | 1/2025 |
| RU | 2 693 267 C1 | 7/2019 |
| RU | 2 776 814 C1 | 7/2022 |
| WO | 2019/089822 A1 | 5/2019 |

OTHER PUBLICATIONS

Newcombe RA, Izadi S, Hilliges O, Molyneaux D, Kim D, Davison AJ, Kohi P, Shotton J, Hodges S, Fitzgibbon A. Kinectfusion: Real-time dense surface mapping and tracking. In2011 10th IEEE international symposium on mixed and augmented reality Oct. 26, 2011 (pp. 127-136). Ieee.*

Dias P, Matos M, Santos V. 3D reconstruction of real world scenes using a low-cost 3D range scanner. Computer-Aided Civil and Infrastructure Engineering. Oct. 2006;21(7):486-97.*

Son H, Kim C. Automatic segmentation and 3D modeling of pipelines into constituent parts from laser-scan data of the built environment. Automation in Construction. Aug. 1, 2016;68:203-11.*

Lehtola VV, Nikoohemat S, Nüchter A. Indoor 3D: Overview on scanning and reconstruction methods. Handbook of big geospatial data. Dec. 17, 2020:55-97.*

Wang H, Li M. A New Era of Indoor Scene Reconstruction: A Survey. IEEE Access. 2024; 12:110160-92.*

Kang Z, Yang J, Yang Z, Cheng S. A review of techniques for 3d reconstruction of indoor environments. ISPRS International Journal of Geo-Information. May 19, 2020;9(5):330.*

Ning X, Ma J, Lv Z, Xu Q, Wang Y. Structure reconstruction of indoor scene from terrestrial laser scanner. InInternational Conference on E-Learning and Games Jun. 28, 2018 (pp. 91-98). Cham: Springer International Publishing.*

Liu C, Wu J, Furukawa Y. FloorNet: A Unified Framework for Floorplan Reconstruction from 3D Scans. arXiv preprint arXiv: 1804.00090. Mar. 31, 2018.*

Li J, Gao W, Wu Y, Liu Y, Shen Y. High-quality indoor scene 3D reconstruction with RGB-D cameras: A brief review. Computational Visual Media. Sep. 2022;8(3):369-93.*

Xiao J, Owens A, Torralba A. Sun3d: A database of big spaces reconstructed using sfm and object labels. InProceedings of the IEEE international conference on computer vision 2013 (pp. 1625-1632).*

Noah Stier et al., "VoRTX: Volumetric 3D Reconstruction with Transformers for Voxelwise View Selection and Fusion", Proceedings of the 2021 International Conference on 3D Vision (3DV), Dec. 2021, pp. 320-330, DOI: 10.1109/3DV53792.2021.00042.

Communication issued on Apr. 18, 2024 by the Russian Patent Office for Russian Patent Application No. 2023122047.

Communication issued on Mar. 27, 2024 by the Russian Patent Office for Russian Patent Application No. 2023122047.

International Communications (PCT/ISA/210 & 237) dated Jul. 3, 2024, issued by the International Searching Authority counterpart in International Application No. PCT/KR2024/004183.

Communication dated Jul. 12, 2024, issued by Russian Patent Office counterpart in Russian Application No. 2023122047.

Wikipedia, "Signed distance function", Jun. 22, 2006 , 2 pages, https://en.wikipedia.org/wiki/Signed_distance_function.

Brian Curless et al., "A Volumetric Method for Building Complex Models from Range Images", Proceedings of SIGGRAPH '96, Aug. 1, 1996, 10 pages.

* cited by examiner (a)

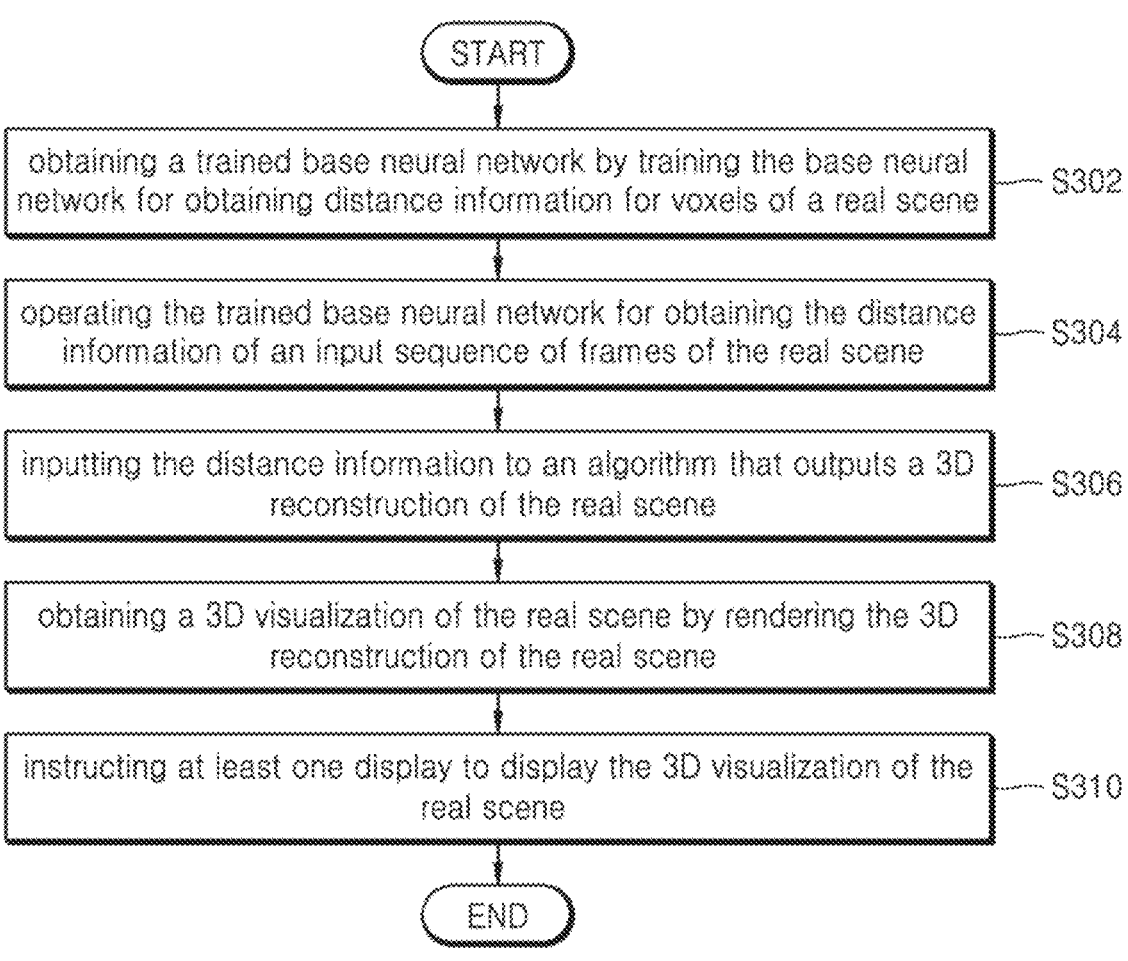

300

START obtaining a trained base neural network by training the base neural network for obtaining distance information for voxels of a real scene — S302 operating the trained base neural network for obtaining the distance information of an input sequence of frames of the real scene — S304 inputting the distance information to an algorithm that outputs a 3D reconstruction of the real scene — S306 obtaining a 3D visualization of the real scene by rendering the 3D reconstruction of the real scene — S308 instructing at least one display to display the 3D visualization of the real scene — S310

END

METHOD AND AN ELECTRONIC DEVICE FOR 3D SCENE RECONSTRUCTION AND VISUALIZATION

CROSS-REFERENCE TO RELATED APPLICATIONS

This application is a continuation application of International Application No. PCT/KR2024/004183 designating the United States, filed on Apr. 1, 2024, in the Korean Intellectual Property Receiving Office, which claims priority from Russian Patent Application No. 2023109346, filed Apr. 13, 2023, and Russian Patent Application No. 2023122047, filed Aug. 24, 2023, the disclosures of which are incorporated by reference herein in their entirety.

BACKGROUND

1. Field

The disclosure can be used in computer vision for generating the 3D scene reconstruction and visualization of results of the 3D scene reconstruction which may be used for visual localization, visual analytics of scene content, namely, detection and segmentation of the scene in 3D space, floorplan estimation, and also for indoor space visualization according to the generated 3D model, and other problems.

2. Description of the Related Art 3D reconstruction is a core problem in computer vision, facilitating applications such as robotics and AR/VR. These usage scenarios require fine-detailed, plausible, and dense reconstructions.

Yet, obtaining such reconstructions still remains a challenge for modern reconstruction methods due to imperfection of input data: incompleteness of observations in the form of occlusions and unobserved regions, between-frame inconsistency, and inevitable measurement errors. Accordingly, reconstruction artifacts might appear. Global artifacts include corrupted scene structure and incorrect partitioning; such severe drawbacks make a reconstructed scene useless in practice.

Besides, local artifacts might arise aplenty: e.g., duplicated surfaces that failed to superimpose after loop closure, holes in occluded and unobserved regions, non-planar walls and floor covered with pits and hills. Being not as dramatic, such artifacts still impose limitations, e.g., for navigation scenarios where room boundaries should be estimated precisely.

Dense 3D reconstruction from RGB (Red, Green, Blue) _images traditionally implies estimating depth maps for RGB images and fusing them, which is another potential source of errors. Recent 3D reconstruction methods try minimizing the undesired effect with the direct prediction of TSDF (Truncated Signed Distance Function) with which it is convenient to set the scene in three-dimensional space, using this function, using the Marching Cubes algorithm, allow to restore a mesh or point cloud corresponding to the scene see for example https://en.wikipedia.org/wiki/Signed-_distance_function). Such methods extract image features using a 2D convolutional neural network (CNN), back-project them into a 3D space, aggregate them, and predict the final TSDF volume using a 3D CNN. Being an efficient way to consider all input images jointly, using TSDF does not resolve the issues with global scene structure and planar surfaces.

In a vast majority of indoor spaces, walls are planar and vertical and a floor is planar and horizontal. This basic, non-restrictive knowledge about indoor scene geometry might be leveraged in the reconstruction process.

Recently, there have been introduced methods that address 3D scene reconstruction via estimating a TSDF volume directly from images. TSDF volume is an effective way to consider all input images jointly; yet, fusing features from multiple views remains a complicated issue. Accordingly, the progress in this field of TSDF reconstruction methods is mainly associated with elaborate feature aggregation strategies.

Atlas first implemented an end-to-end 3D reconstruction pipeline, where image features are back-projected and accumulated into the voxel volume, which is then passed to a 3D CNN predicting TSDF (Truncated Signed Distance Function) volume. Signed distance function (SDF) is the orthogonal distance of a given point x to the boundary of a set $\Omega$ in a metric space, with the sign determined by whether or not x is in the interior of Q. SDF is a standard way to encode 3D space (the distance between space points and the considered object). TSDF is modification of SDF, where large distance values are truncated for faster conversion of 3D reconstruction algorithm. Signed distance functions are commonly used for 3D reconstruction and appeared many time in related art, e.g. ["A volumetric method for building complex models from range images", SIGGRAPH, 1996].

Due to its simplicity, TSDF volume is a commonly used representation for 3D reconstructions, and it is the representation utilized in modern state-of-the-art reconstruction approaches. Atlas exploits an evidently suboptimal averaging strategy to fuse image features, that is revised in the following approaches. NeuralRecon runs a hierarchical fusion strategy: it averages features of nearby views and fuses across view clusters using an RNN network.

NeuralRecon demonstrates a real-time performance on sequential inputs. On the contrary, VoRTX overcomes the limitations of sequential processing, fusing all views jointly.

It introduces a transformer model for TSDF reconstruction and incorporates an attention mechanism at the 2D features level for multi-view fusion. Another transformer-based model, TransformerFusion, employs attention at the voxel level to attend to the most informative features of the image views.

Surface normals represent scene geometry in a way, which is in some sense complementary to depth maps. So they can be used to constrain depth estimates, or treated a source of spatial information in their own right. Accordingly, using normals for 3D reconstruction has been actively investigated over the past years. VolSDF and NeUS minimize photometric loss and additionally constraint SDF using the eikonal loss, encouraging normals estimated as SDF gradients to have a norm of 1. NeuRIS regularizes rendered normals with the normal priors predicted by a trainable method, and leverages multi-view photometric consistency between normals and depths to filter out invalid constraints. NeuralRoom also uses a normal estimation network, and applies normal loss for textureless regions, which cannot be effectively constrained by photometric consistency loss due to shape-radiance ambiguity. Unlike NeurIS and Neural-Room, the disclosure acquires normals directly from the predicted TSDF itself.

In the meantime, various ways of leveraging spatial segmentations for 3D reconstruction have been considered.

SceneCode obtains a segmentation representation with VAE conditioned on an RGB image, and tackles segmentation label fusion by jointly optimising spatial-aware low-dimensional codes of overlapping images.

Numerous methods recognize objects and replace them with CAD models. While providing visually plausible results, this is hardly restoring a real scene, but rather creating a 3D model, more or less resembling it. On the contrary, the disclosure aims to reconstruct the actual scene.

Manhattan-SDF, which is the closest analogue to the proposed NSR (Normal-Segmentation Regularization), focuses on improving the reconstruction of low-textured regions. Manhattan-SDF determines floor and wall regions with a pre-trained segmentation network and forces surface normals of floors and walls to be collinear with three dominant directions so that the resulting reconstruction satisfies the Manhattan world assumption. However, indoor benchmarks, such as ScanNet, contain non-Manhattan scenes with more than three dominant directions, for which Manhattan-SDF is not applicable.

Recent volumetric 3D reconstruction methods face an undesirable trade-off when it comes to relying on input data and restoring a proper scene geometry. Even minor errors or inconsistency in input data might cause the corruption of a reconstructed scene. Global artifacts might reveal themselves in the form of distorted room shapes, with the reconstructed surfaces suffering from local artifacts such as holes, pits, and hills. Fortunately, some of these issues may be addressed by using prior knowledge about the scene, since most rooms are enclosed with planar vertical walls and a planar horizontal floor.

SUMMARY

According to an embodiment of the disclosure, a method for 3D scene reconstruction and visualization using at least one processor is provided. The method may comprise obtaining a trained base neural network by training the base neural network for obtaining distance information for voxels of a real scene. The method may comprise operating the trained base neural network for obtaining the distance information of an input sequence of frames of the real scene. The method may comprise inputting the distance information to an algorithm that outputs a 3D reconstruction of the real scene. The method may comprise obtaining a 3D visualization of the real scene by rendering the 3D reconstruction of the real scene. The method may comprise instructing at least one display to display the 3D visualization of the real scene.

According to an embodiment of the disclosure, an electronic device for 3D scene reconstruction and visualization is provided. The electronic device comprises at least one display, at least one memory and at least one processor. The at least one processor configured to execute the instructions to obtain a trained base neural network by training the base neural network for obtaining distance information for voxels of a real scene. The at least one processor configured to execute the instructions to operate the trained base neural network for obtaining the distance information of an input sequence of frames of the real scene. The at least one processor configured to execute the instructions to input the distance information to an algorithm that outputs a 3D reconstruction of the real scene. The at least one processor configured to execute the instructions to obtain a 3D visualization of the real scene by rendering the 3D reconstruction of the real scene. The at least one processor configured to execute the instructions to instruct at least one display to display the 3D visualization of the real scene.

According to an embodiment of the disclosure, a non-transitory computer-readable medium storing program instructions that when executed by at least one processor, cause the at least one processor of an electronic device to implement the method is provided. The method may comprise obtaining a trained base neural network by training the base neural network for obtaining distance information for voxels of a real scene. The method may comprise operating the trained base neural network for obtaining the distance information of an input sequence of frames of the real scene. The method may comprise inputting the distance information to an algorithm that outputs a 3D reconstruction of the real scene. The method may comprise obtaining a 3D visualization of the real scene by rendering the 3D reconstruction of the real scene. The method may comprise instructing at least one display to display the 3D visualization of the real scene.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates a process flow depicting a method for 3D reconstruction and visualization, according to an embodiment of the present disclosure.

DETAILED DESCRIPTION

Figure 1A:
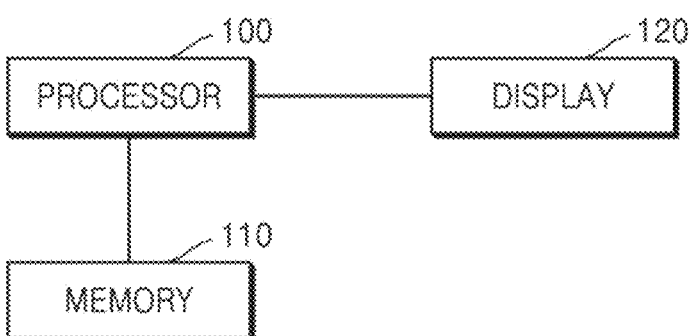
FIG. 1A illustrates an electronic device according to one or more embodiments.

Proposed is an electronic device containing a processor and a memory that stores instructions for performing the operations of the proposed method.

At least one of the plurality of modules may be implemented through a neural network. A function associated with neural network may be performed through the non-volatile memory, the volatile memory, and the processor.

The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) network stored in the non-volatile memory or the volatile memory, and implemented by a hardware. The hardware comprises a non-transitory computer-readable medium storing a software or instructions that cause at least one processor to perform operations according to an embodiment.

Here, being provided through training means that, by applying a training algorithm to a plurality of training data, a predefined operating rule or neural network with desired characteristics is made. The training may be performed in an electronic device itself in which neural network processing is performed according to an embodiment is performed, and/o may be implemented through a separate server/system.

The neural network (base neural network) may consist of a plurality of neural network layers. Each layer has a plurality of weight values, and performs a layer operation through calculation of a previous layer and an operation of a plurality of weights. Examples of the base neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The training algorithm is a method for training a predetermined target device (for example, a robot) using a plurality of training data to cause, allow, or control the target device to make a determination or prediction. Examples of training algorithms include, but are not limited to, supervised training, unsupervised training, semi-supervised training, or reinforcement training.

Meanwhile, the above-described method performed by the electronic device may be performed using an artificial intelligence model.

Visual understanding is a technique for recognizing and processing things as does human vision and includes, e.g., object recognition, object tracking, image retrieval, human recognition, scene recognition, 3D scene visualization, or image enhancement.

The disclosure can be used for systems for indoor visual analytics, mobile and terrestrial 3D scanning systems for different indoor scenes, for example, apartments, offices, retails spaces, etc. The disclosure focuses on detecting and aligning structural elements such as vertical and horizontal surfaces (for example floor and walls) in indoor spaces and can be used during 3D reconstruction and visualization of a 3D scene.

The application uses the following terms.

A 3D scene reconstruction is a point cloud or a mesh, that is, a mathematical representation of a 3D object, which is obtained by applying algorithms known from the related art (for example, Marching Cubes) to a TSDF volume.

A 3D scene visualization is the visualization, for example, on a display device, of said 3D scene reconstruction, that is, a two-dimensional image, which shows what the object looks like, given by the point cloud of the scene or the mesh of the scene.

Rendering is a method for obtaining the mentioned 3D scene visualization from the 3D scene reconstruction. Truncated Signed Distance Function (TSDF) refers to a mathematical representation used in computer graphics and computer vision to describe and represent the shape and structure of a 3D object or scene.

A distance information refers to a representation of 3D space that encodes information about the distances between points in space and the surfaces or objects in that space. The distance information may include TSDF volume.

A backbone refers to the core architecture or structure of the network, often in the form of a pre-trained model that serves as the foundation for a specific task or application.

A base neural network is any known neural network implementing obtaining a TSDF volume for voxels of a scene from a sequence of RGB frames with camera poses. The base neural network includes a backbone and a TSDF head.

Proposed is NSR (Normal-Segmentation Regularization), a plug-and-play modification of methods that address scene reconstruction by predicting TSDF. The proposed regularization can be integrated into any known reconstruction method (the base neural network) that predicts TSDF from a sequence of frames with camera poses. According to the disclosure, NSR includes the work of several components, one of them is a 3D sparse convolutional segmentation module (a Segmentation head), in addition, NSR includes the calculation of normals, determining normals in the areas of walls and floors and computing their deviations from horizontal/vertical, as will be described below.

The proposed modification considers, when training, scene structure by detecting walls and floor in a scene and penalizing the corresponding surface normals for divergence from horizontal and vertical directions, respectively, (thus, the deviation of normals from the required directions is taken into account) as will be described below.

The disclosure makes it possible to eliminate global artifacts during 3D scene reconstruction. Thanks to the disclosure, room shape distortions are reduced or eliminated, and some local artifacts (such as holes, pits and hills in 3D scene reconstruction and its visualization) are removed.

Currently, the disclosure can be applied to the data captured by smartphones with tracking systems (e.g. ARCore for Android smartphones) or any video data with known camera trajectory (e.g. obtained by RealSense T265). The user can shoot a video of the room using, for example, a smartphone, and with the help of the disclosure, a 3D scene reconstruction is obtained in the form of a mesh of the scene or point cloud of the scene, which after rendering is converted to the 3D scene visualization, which the user can see on the display.

It is possible to render the mesh or the cloud of points, then the visualization (image) of the scene will be obtained under the view required by the user. It can be used, for example, for VR/AR applications (games, interior design, real estate applications or for navigation). Minimal component list: a camera, a tracking module, evaluating the position and angle of the camera, a memory device with a processing unit and with possibility of operation of neural networks.

Main contributions of the disclosure are as follows:

NSR is introduced, a modification of 3D scene reconstruction methods, which includes a novel trainable module and an associated training procedure with normal-segmentation losses of the base neural network on a data set, for which there is a video with camera positions and angles, ground truth reconstructions and segmentation markup of floors and walls. As a result of training, obtained is the base neural network that receives video with camera positions and angles as input, and predicts TSDF and segmentation into 3 classes (floor, walls, other). At the same time, when the base neural network has already been trained, segmentations prediction is not needed for the main goal (determining walls, floor, others), only TSDF prediction by which the mesh can be calculated is used. NSR can be incorporated into an arbitrary trainable pipeline (neural network) that outputs TSDF and trained end-to-end on semantically annotated 3D data. There are public sets of such data for training (training sequences of RGB frames with corresponding camera pose data), for example, ScanNet [ScanNet: Richly-annotated 3D Reconstructions of Indoor Scenes, CVPR, 2017] (which was used to train the base neural network in the disclosure). The concept of "supervised training" is implemented, that is, in order for the base neural network to correctly predict TSDF and segmentation classes, it needs to receive examples of such data during training.

NSR are applied to several state-of-the-art reconstruction approaches and demonstrate a performance gain and improving the quality of reconstruction over the state-of-the-art on multiple datasets. A proposed development is a regularization that can be applied to an arbitrary room scene reconstruction method that predicts TSDF from pose videos.

A key contribution of the disclosure is a novel geometry-segmentation regularization consisting in introducing auxiliary normal losses optimized together with an extra segmentation head. The training units for the base neural network proposed by the disclosure improves the quality of scene reconstruction: coverage, accuracy, recall, F1-measure and allows to get smoother and more even reconstructions with fewer "holes" and "bumps".

During training, 3D reconstruction results are not calculated. During training, the TSDF prediction, segmentations and normal prediction are calculated, the values of the loss function are calculated and they are minimized. However, if a TSDF is predicted for a scene, then the 3D reconstruction itself can be calculated from it (using the Marching Cubes algorithm). During training, this is not necessary, but when the network is already trained, it is done to obtain a reconstruction.

The trained base neural network considered in the disclosure is such that as a result of its work (if the Marching Cubes algorithm is also applied), it is possible to obtain a cloud of points or a triangular mesh (triangle mesh) corresponding to the scene. That is, if it is the cloud of points the result is a set of scene points (their coordinates and colors) and, if it is a mesh—the result is triangular faces connecting some triplets of these points (i.e., a surface of triangles).

Briefly, the procedure for obtaining the 3D scene visualization is as follows:

operating the base neural network model, trained as will be described below, for obtaining TSDF volume of input sequence of RGB frames of real scene.

applying, to the TSDF volume, an algorithm that calculates 3D scene reconstruction (representation in a form of triangle mesh);

rendering the 3D scene reconstruction for obtaining the visualization of the 3D scene.

Implemented as a 3D sparse convolutional module, NSR can be incorporated into an arbitrary trainable pipeline that outputs TSDF, and can be trained end-to-end on 3D segmentation point clouds.

During inference, when applying an already trained base neural network to new (never seen before) data, modules used in training the base neural network are not needed, so presence of NSR when training does not impose any restrictions on usage scenarios.

Also, proposed is a hardware comprising computer-readable medium stored a software product implementing the method for reconstruction of 3D scene using a normal-segmentation TSDF Regularization when training of the base neural network, wherein the proposed training operations of the method are suitable for any existing base neural network for 3D reconstruction. More specifically, the proposed training operations can train any base neural network implementing reconstruction of 3D scene with predicting TSDF from a posed RGB video. That is, color video of the scene and the positions of the cameras for each frame of this video are fed to the input of the trained base neural network, the result in form of a stationary 3D reconstruction of this scene is obtained after applying an algorithm to the TSDF volume at the output of the trained base neural network.

The disclosure can be used for any devices capable of shooting video and evaluating the camera trajectory (camera positions and angles for each video frame). It can be a tracking camera (for example, RealSense T265), a smartphone (for example, an Android smartphone with Google ArCore system), a robotic vacuum cleaner equipped with a video camera and a tracking system, or even just a video camera, to which data are applicable trajectory estimation methods.

FIG. 1A illustrates an electronic device (e.g. computing device) according to one or more embodiments, that may implement a method or program instructions according to one or more embodiments. The electronic device includes at least one processor 100 connected to at least one memory 110 and at least one display 120. Memory 110 (e.g. non-transitory computer-readable medium) can store program instructions causing processor 100 to execute a method according to one or more embodiments, which can generate a 3D visualization of a real scene. Processor 100 can instruct display 120 to display the 3D visualization of a real scene.

Figure 1B:
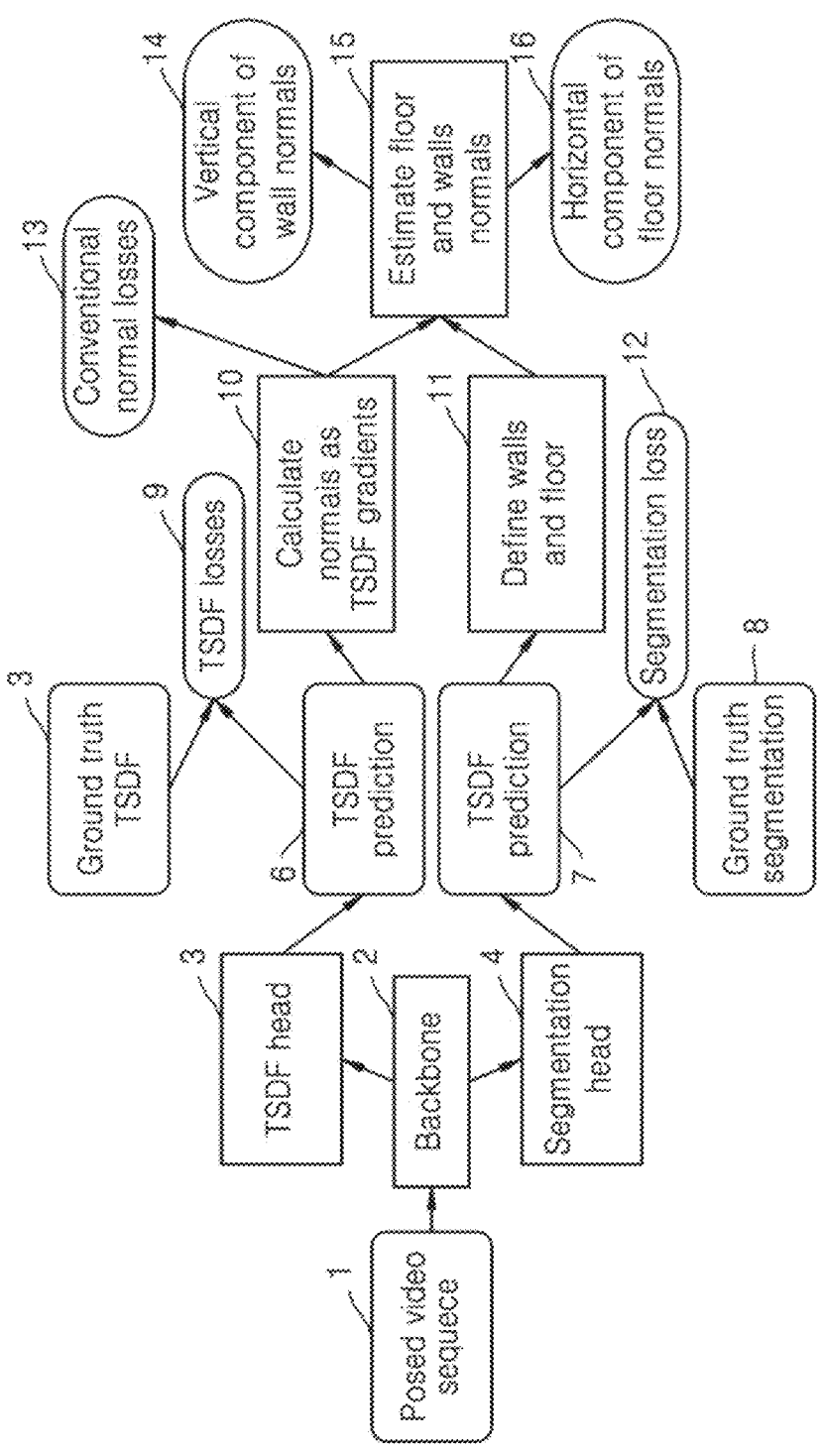
FIG. 1B illustrates proposed training procedure for modified 3D reconstruction methods.

FIG. 1B illustrates proposed training procedure for modified 3D reconstruction methods. Brief key concept of the disclosure consists in a method of training an Artificial intelligence (AI) network (the base neural network) for 3D reconstruction of the scene with NSR (Normal-Segmentation Regularization), comprising:

OPERATION 1: extracting image feature value, and predicting representation of 3-dimensional space using the neural network. It should be noted that the image feature value are data elements that are of maximum interest and that will be transmitted and analyzed by the neural network, i.e. the image feature value are internal (hidden, intermediate) representations for the neural network. This operation is conducted by blocks 2, 3, 5, 6, 9 indicated in FIG. 1B. As will be detailed below, blocks 2, 3, 5, 6, 9 carry out inputting training data into the backbone; applying TSDF head computing TSDF losses.

OPERATION 2 is used only while training the base neural network: segmenting the space with segmentation information (such as floor/wall). This operation is conducted by blocks 4, 7, 8, 11, 12 indicated in FIG. 1B. As will be detailed below, blocks 4, 7, 8, 11, 12 carry out applying Segmentation head; computing segmentation losses; defining the areas of floor and walls.

OPERATION 3 is used only while training the base neural network: training the base neural network so that the defined floor and wall should be flat. This operation is conducted by blocks 10, 11, 13, 14, 15, 16 indicated in FIG. 1B. As will be detailed below, blocks 10,11,13,14,15,16 carry out computing normals coordinates as TSDF gradients; selecting normals in wall areas and computing their vertical components; selecting normals in floor areas and computing their horizontal components; computing conventional normal losses; providing backpropagation by updating the neural network parameters according to the calculated gradient for decreasing of the common loss function.

The above operations happen repeatedly in the process of training the base neural network. However, only the first operation is carried out when operating of the already trained base neural network. Inputted training data are only used for training, and while operating of the trained base neural network inputted data are RGB frames and camera pose in space. Thus, blocks 4, 7, 10, 11, 12, 13, 14 15, 16 are not used when operating trained base neural network.

Thus, the base neural network is trained in a new way. When the base neural network has already been trained in this way, a 3D reconstruction of the scene can be obtained without artifacts in the areas of the floor and walls during operation of the base neural network. When the base neural network is running after the proposed training, the output of the 3D scene reconstruction occurs as usual, just like in the basic version of the base neural network.

That is, NSR is normally-segmentation regularization, which is applied precisely during training. During the output of a 3D scene reconstruction of the already trained base neural network, the base neural network is used, which, owing to NSR, turns out to be better trained. NSR is a modification of 3D reconstruction of the scene methods which operates under an assumption of a conventional scene structure.

During operation, the trained base neural network simply determines the TSDF value in all voxels, but thanks to training by NSR, the result of the output of the 3D reconstruction is such that the floors and walls in it turn out to be even.

Walls and a floor are found in the reconstructable scene and when training, NSR imposes constraints on their normals in the operations 2 and 3. The constraints consist in that:

the normals (i.e. perpendiculars) to the wall surface should be as horizontal as possible, so that the walls are vertical, and the normals to the floor surface should be as vertical as possible, so that the floor is horizontal.

The assumption "should be as horizontal/vertical as possible" means that the deviation of the normals from the required direction is penalized, that is, a term corresponding to the deviation of the normals from the required directions are added to a minimized common loss function. Deviation is the difference between the current value and the ideal value. This difference can be equal to zero, which corresponds to the absence of deviation, but even for a qualitative 3D model, this will be a non-zero number, that is, from a mathematical point of view, this is an additional term. Minimization of the common loss function may be carried out by any known method, however in the disclosure the gradient methods are used, for example, by the method of adaptive gradient descent, namely Adam [Adam: A Method for Stochastic Optimization, https://arxiv.org/abs/1412.6980].

The separate loss functions are composed of values corresponding to of the degree of difference between the predicted TSDF and ground truth (TSDF loss), the degree of difference between the predicted semantic labels and ground truth semantics (semantic loss), the degree of difference between surface normals and ground truth normals (conventional normal losses), the degree of non-vertical walls and non-horizontal floor (added normal deviations). From such separate loss functions (penalizations) corresponding to different quality criteria of the 3D model, the common loss function is formed, which is minimized in the process of training the base neural network.

The common loss functions describe some mapping that takes a prediction as input and returns a value such that the better the prediction, the smaller this value. In other words, the common loss function is a mathematical interpretation of the degree to which the current base neural network differs from the "ideal" one. And the smaller the common loss function value, the better, therefore it is minimized, that is, values of the base neural network parameters, such as weights are selected for which the value of the common loss function will be as low as possible (for example, the closer the normal projection is to 0, the closer the normal is to the ideal). The common loss function is only used to train the base neural network. The common loss function contains all the restrictions that are imposed on the 3D model. Namely, as will be described in detail below: restrictions on the TSDF (they are taken from the base neural network, this can be the degree of difference between the predicted TSDF and ground truth, the degree of difference between the prediction of whether the voxel contains a scene point or not from ground truth, etc. Also, in the common loss function, presented are conditions for the difference between predicted semantic labels and ground truth, the difference between predicted normals and ground truth, the difference in lengths of normals from one, the deviation of normals to walls/floors from horizontal/vertical directions).

The deviation of wall normals from the horizontal direction is equal to length of their vertical component (i.e. projection of the wall normal on the z-axis), that is, if the normal to the wall has an ideal horizontal direction, then the vertical component is equal to 0. Deviation of floor normals from the vertical direction is equal to length of their horizontal component (i.e. projection of the floor normal on the x-y plane), that is, if the normal to the floor has an ideal horizontal direction, then the horizontal component is equal to 0.

The TSDF function is calculated in the voxel volume for the scene, and the distance from each voxel to the nearest surface is saved as the TSDF function value for each voxel. The surface normals in the voxel volume for the scene are calculated as gradients of the TSDF function (since the reconstructed surface is a level surface for the TSDF, i.e. the solution of the TSDF=0 equation), which are also calculated and saved for each voxel.

The normals are perpendicular to the surface by definition, but the surface may not be ideal, for example, the floor may not be horizontal, but sloping or with holes/hills, and the walls may not be vertical. It should be noted that artifacts appear during reconstruction of the scene due to many factors: inaccurate estimation of the camera trajectory, insufficiently trained the base neural network or insufficient coverage of the scene with frames, due to which part of the scene may be "not visible". In this disclosure, a natural assumption is made that in real scene the walls in the rooms are vertical, without artifacts, and the floors are horizontal without artifacts, training is carried out based on this assumption.

The 3D model of a scene is a point cloud or mesh. The 3D reconstruction of scene is carried out from a sequence of frames representing images of the scene and the corresponding camera positions and camera angle for each frame from the sequence on the basis of the 3D model of a scene. Image frames are captured by a camera, camera parameters are estimated by a tracking system or one of the appropriate localization methods applied to video in the art.

The base neural network, for which the disclosure can be used, comprises "backbone"—a main part that calculates features, and TSDF head. Two "heads" are calculated predictions based on these features, namely predicting TSDF are calculated by TSDF head, and segmentations are calculated by Segmentation head. In other words, if an arbitrary base neural network is taken to use the proposed method, then this base neural network has the backbone and TSDF head initially, and the Segmentation head is added for training. For example, in Atlas the backbone is a 2D CNN that predicts features in images, a projection in 3D, and the encoding part of the 3D network, and the remaining decoding part is the hereconstruxtrionad. VoRTX is similarly, but also an intermediate transformer network for merging features.

The disclosure consists in a method for visualization of 3D scene (real scene) using a neural network consisting of a base neural network, including a backbone and a TSDF head, and a segmentation head, based on training using the normal-segmentation TSDF Regularization (that is, using defining semantic structural elements and aligning them), and comprising the followings operations:

Training of base neural network (as follows from FIG. 1B):

Training data of a training scene, representing training RGB frames with corresponding camera data in form of input tensors (block 1 in FIG. 1B), are inputted into the backbone (block 2 in FIG. 1B). The backbone processes input tensors and calculates intermediate features, that will be further used for TSDF prediction and segmentation. The outputs of the backbone are the intermediate representations of the input which may be considered as inner features of the sequence.

TSDF head (block 3 in FIG. 1B) is applied for the intermediate features outputted by the backbone. TSDF head predicts the TSDF volume to get TSDF prediction of TSDF values in each voxel of the training scene, each voxel has a corresponding TSDF value at that location. For each voxel in space, it is necessary to determine the distance from this voxel to the surface of the object being reconstructed. The sign prediction of TSDF characterizes on which side of the surface the voxel is located, if the voxel is inside this object, then the distance is taken with a minus sign, otherwise with a plus sign. Block 6 presents the result of block 3, that is the TSDF prediction for the entire voxel volume.

Computed are TSDF losses between TSDF prediction data and ground truth scan data (from block 5 in FIG. 1B). The calculation is carried out after the backbone in a separate module "TSDF losses" (block 9 in FIG. 1B). This module takes the TSDF and the ground truth scan predictions as inputs and calculates the TSDF losses. The ground truth scan is a "correct" scan obtained using a laser scanner, a depth sensor, or some other known method. The ground truth scan is the ideal reconstruction that any trainable base neural network strives to reconstruct when trained. Losses are an indicator of how much the current reconstruction differs from the ideal one (the ground truth). The base neural network is trained to reconstruct the scene as accurately as possible, losses are calculated and a gradient optimization method is applied to minimize common loss function. Therefore, the base neural network parameters are iteratively updated so that the losses decrease and the predictions are as close as possible to the "ideal".

Segmentation head (block 4 in FIG. 1B) is applied for the intermediate features being outputted from the backbone to get segmentation prediction (block 7 in FIG. 1B). The segmentation head consists of several layers, which are added to the base neural network and predicts the segmentation labels in each voxel. Segmentation label is the label of the class to which the given voxel belongs, in this case the label of the class "floor", "walls", "other".

Computed are segmentation losses (block 12 in FIG. 1B) between the segmentation prediction (block 7 in FIG. 1B) and Segmentation Ground Truth (block 8 in FIG. 1B). The Segmentation Ground Truth is known for the training set.

The TSDF head and Segmentation head can be performed in parallel. The TSDF losses are calculated based on TSDF prediction (i.e. after that). Likewise, the Segmentation loss is calculated based on the segmentation prediction (i.e. after that).

All calculated losses (TSDF losses, segmentation losses, and normal-dependent losses (which are described below) are added to a common loss function, which is optimized in the process of neural network training. The calculated losses are used for error backpropagation, i.e. updating the parameters of the base neural network in accordance with the gradient of the common loss function over these parameters.

Defined are the areas of floor and walls from the segmentation prediction (block 11 in FIG. 1B)

That is, during segmentation the areas of the floor and walls are determined, that is, those voxels for which the label "floor" or "wall" is predicted. For each point in space, it is determined whether it is a wall, a floor, or something else. Therefore, the wall and floor areas are determined in one pass.

Computed are normals coordinates as TSDF gradients (the normal is a 3D vector; block 10 in FIG. 1B). The normals are computed across all voxels in the space (the scene) as the gradients of the predicted TSDF. If a surface is the isosurface of some function, then the gradient of this function will be perpendicular to the surface. First, the normals are calculated at all training voxels of the training scene, that is, the direction of the normal to the surface in each voxel is calculated as a gradient from the TSDF function. If the surface is a level surface of some function (this is the level surface of 0 for TSDF, that is, the solution is TSDF=0), then the gradients of this function are perpendicular to this surface, that is, they are normals.

Then all the normals are calculated, those that correspond to the voxels of the walls are chosen (the segmentation head just predicts which voxels are the walls, which are the floors, and which are everything else). And for the normals in the wall voxels, the vertical component is calculated. Similarly, for normals in floor voxels, the horizontal component are calculated. Namely:

Selected are normals in wall areas (block 15 in FIG. 1B) and computed are their vertical components, i.e. z-components of the normal (block 14 in FIG. 1B), based on data obtained from blocks 10 and 11), i.e. the projection of the normal onto the vertical plane, at that the normals which correspond to voxels segmented as a "wall" are chosen. If the wall is perfectly flat, then the normals at all points of the wall will be the same, if not, they may be different. Selected are normals in floor areas (block 15 in FIG. 1B) and computed their horizontal components (block 16 in FIG. 1B), i.e. the projection of the normal onto the horizontal plane Oxy, at that the normals which correspond to voxels segmented as a "floor" are chosen.

Computed are conventional normal losses (block 13 in FIG. 1B; loss functions for normals), which are classically used for reconstruction, from blocks 10 (prediction) and 5 (ground truth).

The conventional normal losses include:

1. Difference between the predicted normals (gradients of the predicted TSDF) and the corrected ones (gradients of the TSDF for the Ground Truth scan). To calculate these losses, predicted and real normals are needed. The predicted normals are calculated from the base neural network. The real normals are calculated from the scans present in the training data.

2. Eikonal Loss—the difference in the lengths of the normal vectors from one (since TSDF corresponds to the distance to the surface, the gradient of this function should ideally have a unit length. And the difference in length from one is also penalized. To calculate these losses, only the predicted normals are needed.

Both of these conventional normal losses are often encountered in the related art, for example in [MonoSDF: Exploring Monocular Geometric Cues for Neural Implicit Surface Reconstruction, NeurIPS, 2022]).

The common loss function is calculated, which is equal to the sum of the TSDF losses, the segmentation losses, the conventional normal losses;

A gradient of the common loss function is calculated with respect to the base neural network parameters. The base neural network parameters are updated according to that gradient for decreasing (minimize) of the common loss function from epoch to epoch of the training. That is, backpropagation of the error is carried out, as known from related art. Minimization is carried out in order to find such base neural network parameters with which the predictions will be the most accurate (the principles of optimization based on gradients used in neural networks are described above). The training process of the neural network is the selection of such parameters of the neural network, in which TSDF prediction will be as close as possible to the ideal. The base neural network parameters are selected (trained) in such a way that there are no irregularities. And the final trained base neural network immediately reconstructs the scene in such a way that the floors and walls are even. During training, the base neural network takes into account all deviations of walls and floors from the "ideal" planes (vertical/horizontal) and penalizes (adds to the common loss function) them all, regardless of whether this deviation occurs on a large area or on a small one. Each point, segmented as walls or floors, contributes to the optimization of the base neural network. And this contribution is equal to the deviation of the normal at this point from the horizontal/vertical direction. In the training process, there are such parameters of the base neural network for which the common loss function is minimal, when these parameters are found, the common loss function itself is no longer used, but these "optimal" parameters of the base neural network are used.

Backpropagation provides updating the base neural network parameters according to the minimized loss function. The common loss function decreases after each training epoch. The training operations are repeated until the common loss function stops decreasing, or until the common loss function reaches predetermined threshold value (e.g. set by the developer). Also, training process can be carried out for a fixed number of epochs, the same as in baselines of the neural network, there can also be other criteria for stopping the training process, for example, until the value of the common loss function in the next training epoch is below a predetermined threshold value.

At the stage of operation of the trained base neural network, only blocks 1, 2, 3, 6 are used. Operating of the trained base neural network, comprising the following operations:

the sequence of RGB frames of the real scene are taken with a camera from different angels and position of the camera in space. Camera data represents the position of the camera in space in a fixed coordinate system, which is given by a 3D vector, and camera angle, which is a 3×3 rotation matrix (a direction cosine matrix). The 3×3 rotation matrix can be obtained in any way, for example, SfM (for example COLMAP (Structure-from-Motion Revisited, CVPR, 2016) or some SLAM (for example ORB-SLAM: A Versatile and Accurate Monocular SLAM System, IEEE Transactions on Robotics, 2015). Input RGB frames with corresponding camera data are taken from the camera with which they are received, or from the memory of the electronic device in which the proposed method is implemented. If the camera can calculate camera positions (for example, an Android smartphone with an ArCore tracker), then the data may be immediately feed to the electronic device in which the calculations will be performed. Otherwise, the corresponding camera data (perhaps on the electronic device that will calculate everything else) TSDF head should first be obtained.

The RGB frames and the camera data are inputted into backbone of the trained base neural network in form of input tensors. The trained base neural network obtains the TSDF volume of input sequence of RGB frames of real scene. The three-dimensional surface is defined as the zero-level isosurface of TSDF. This is done using the known algorithms, for example, Marching Cubes algorithm (related art ["Marching cubes: A high resolution 3D surface construction algorithm", SIGGRAPH, 1987] Thus, for RGB video of a scene with known camera trajectory, the 3D reconstruction of the scene is set in a form of point cloud or triangle mesh, as described above. At that, the floor and walls in the resulting 3D scene reconstruction (i.e. 3D reconstruction of the real scene) do not have local artifacts, such as holes, pits and hills, etc. Floor and walls are segmented, i.e. each voxel is marked with a label of the class to which this point corresponds. In the case of the disclosure, these classes are "floor", "wall", "other".

Further the rendering the 3D scene reconstruction is performed for obtaining the 3D scene visualization (i.e. 3D visualization of the real scene). The resulting 3D scene visualization is then displayed to the user using a display.

The proposed trained base neural network is generated so that the areas corresponding to the floor are flat and horizontal, and the areas corresponding to the walls are flat and vertical.

Unlike traditional methods of 3D reconstruction which optimize the geometrical correctness of the scans, in the proposed regularization approach the structural elements of a scene (floor and walls) are additionally segmented, and the base neural network is optimized so that these elements should be flat, the floor surface of a scene should be horizontal and the walls should be vertical.

An auxiliary wall and floor segmentation module (segmentation head), namely additional layers that are added after the backbone to predict segmentation labels, is trained jointly with the base neural network predicting the TSDF of the scene, and in the areas corresponding to the floor and walls the normal directions to scene surface, that is, all the surfaces that are in the scene are estimated. In the wall areas the vertical component of these normal is penalized, and in the floor areas the horizontal component is penalized, it is means that:

at each point in the areas in which the Segmentation head class predicts a wall, the vertical components of the normal vectors are considered, and the length of this vertical component (that is, the z-component of the normal vector) is added to the loss function, and in areas where the "floor" class is predicted, the horizontal component (x- and y-components of the normal winds) is considered and the loss function is added for this component (the norm of a two-dimensional vector composed of these two components).

If there are such x, y, z-components in the loss function, the base neural network parameters are updated so that these terms become smaller. A smaller value of these terms leads to a more leveling of the scene surface in the areas of the floor and walls. If the floor normals become more vertical, then the floors themselves become more horizontal, and similarly for the walls.

That is, optimization is carried out by gradient descent methods (namely, by the stochastic optimization method [Adam: A Method for Stochastic Optimization, https://arxiv.org/abs/1412.6980], common for training neural networks. Optimization allows you to align the areas of walls and floors, because that this optimization process reduces the values of the common loss function, including the terms corresponding to the normals to the walls and the floor. The smaller the mentioned terms, the less the normals deviate from the "correct" directions, and, accordingly, the more aligned the floor and wall surfaces themselves turn out to be. Such an optimization allows to align the areas of the walls and floor and prevent the occurrence of reconstruction errors such as wall rounding, holes, pits, and hills in the surfaces.

A. Novel Segmentation Head (block 4 in FIG. 1B).

The segmentation head is a 3D sparse convolutional network, inspired by 3D sparse U-Net. Since, the architectures of TSDF predicting pipelines have U-Net architectures, as well, the segmentation head branches off from its encoder and consists of two 3D sparse convolutional modules. Each module includes a sparse 3D convolution followed by batch normalization and two residual 3D convolutional blocks. The proposed segmentation head outputs 3D segmentations in a form of a spatial map with 3 channels each corresponding to a single segmentation category: walls, floor, and other.

B. Training

Trained is the base neural network, which predicts TSDF volume of a scene. This base neural network is trained in such a way that the areas of floor and wall tend to be horizontal and vertical, respectively. For this purpose, the base neural network is trained to predict segmentation label jointly with TSDF. When TSDF and segmentation labels are predicted, the surface normals are computed as gradients of TSDF. The areas of floor and walls are considered. For the points segmented as floor, the divergence of corresponding normals from vertical direction is added to loss function. Similarly, for the points segmented as walls, the divergence of corresponding normals from horizontal direction is added to loss function. These loss terms aim at making the surface of floor more horizontal and the surfaces of walls more vertical.

Proposed is training the 3D segmentation head on the ScanNet dataset featuring point clouds annotated with per-point segmentation labels, i.e. there are point clouds in the dataset, in which each point is annotated (labeled) with the label of the corresponding segmentation class. Original ScanNet categories floor and carpet are remapped into the "floor" category, while wall, window, door, picture comprise the "walls" category. All points considered belonging neither to walls nor floor categories, fell under the "other" category. A separate ceiling category is not considered, since there are too few ceiling points in ScanNet scans due to the capturing process.

The training is performed in two stages. At the first stage, the base neural network that predicts TSDF is trained jointly with the 3D segmentation head. The 3D segmentation head learns to divide points into three categories (floor, walls, other) guided by segmentation losses. The scene geometry is not penalized during the first epochs so that the entire training procedure does not get disrupted by early erroneous estimates segmentation classes. That is, at the initial stages, the base neural network that has not yet been trained will most likely incorrectly predict belonging to the classes "floor", "walls", "other".

During the first training epochs, the proposed penalty on floor and wall normals is not applied. This means that in these first epochs, the terms corresponding to the vertical/horizontal components of the wall/floor normals are not added to the common loss function. Primarily, the neural network trains to reconstruct the entire scene (using the TSDF head) and determine the walls, floor, other (using the segmentation head).

When the base neural network is already able to determine where the walls and floor are, then terms for normals are added to the common loss function and the common loss function is optimized. At the same time, TSDF and segmentation losses also continue to participate in optimization.

In general, the wording "penalized" means that the corresponding term is added to the common loss function. The fact that at the beginning of training the terms for normals are not added is determined from common sense: while the base neural network is not yet trained, the floors and walls in it will most likely be determined incorrectly, so the wrong normals will be corrected. Nothing happens to the fined data. The difference between the predictions and the "ideal" is "penalized", and this term means that this difference is added to the minimized common loss function. During subsequent epochs losses are added on surface normals and proceed with a joint prediction of the scene geometry and segmentations (blocks 6, 7 in FIG. 1B). I. e. the terms corresponding to the vertical/horizontal components of the wall/floor normals are added to the common loss function. The optimization process continues. Surface normals are derived from an estimated TSDF representation: being first-order derivatives of a surface function, they can be easily computed with a single convolution. The normal estimation is implemented as a custom non-trainable 3D convolutional layer, so that this operation can be easily incorporated into a trainable pipeline.

C. Losses

Used are two groups of losses depending on surface normals. First, exploited is conventional normal losses. Extracted are ground truth normals from a ground truth TSDF representation and penalize (the difference between prediction and ground truth is added as a term to the loss function, which is minimized) the divergence between predicted and ground truth normals using both cosine distance (the distance inverse to the normalized scalar product of vectors) and Euclidean distance. These reference-based losses are complemented with a non-reference Eikonal loss that regularizes the L2-norm of normal, forcing it to be close to 1. Ground truth data is used only at the training stage. Once the base neural network has been trained, it can be applied to data for which there is no ground truth.

Besides, introduced conventional losses are normal-segmentation regularization that considers both surface normals and 3D segmentations (segmentation markup (annotation with a meta class) of each three-dimensional point. Generally speaking, encouraged are walls to be vertical, and a floor to be horizontal. For convenience, let denote a set of 3D points classified as floor as $\mathcal{F}$, and walls as $\mathcal{W}$.

W. Regularized are non-vertical components of a normal $n_z$, $n_y$ in each point $(x,y,z) \in \mathcal{F}$ :

$$\mathcal{L}_{floor} = \frac{1}{|\mathcal{F}|} \sum_{(x,y,z)\in\mathcal{F}} \|(n_x, n_y)\|_2. \tag{1}$$

For walls, employed is a L1-loss for a vertical component $n_z$:

$$\mathcal{L}_{walls} = \frac{1}{|W|} \sum_{(x,y,z)\in W} |n_z|. \tag{2}$$

In ablation studies, examined is how each loss affects the reconstruction quality, and prove them to be complementary, targeting different aspects of reconstruction.

D. Inference

During inference, 3D segmentations is not required. Therefore, 3D segmentation annotation serves for training purposes only: guided by additional segmentation information, the method trains to predict TSDF more accurately.

EXPERIMENTS

A. Baselines

Considered are several state-of-the-art TSDF reconstruction methods as baselines. Selected are methods based on different working principles to prove the proposed modification to be applicable to a wide range of multi-view fusion approaches. That is, there are many different methods of TSDF reconstruction for a scene taken from different angles in the field of engineering. The regularization proposed in the disclosure can be applied to any of them, no matter what principles they are based on. To confirm this, several existing methods based on different principles are considered (described below).

Specifically, used is transformer-based VoRTX and the averaging-based Atlas. (blocks 2, 3 in FIG. 1B; backbone and TSDF head).

Atlas fuses features into a single feature volume. It omits depth estimation and addresses 3D reconstruction with direct prediction of a TSDF volume. This scheme allows considering input images jointly and efficiently. Moreover, Atlas is supplied with a mechanism that enables reconstructing unobserved scene regions via 3D priors.

VoRTX is an end-to-end volumetric 3D reconstruction method tackling multi-view feature fusion with transformers.

VoRTX retains fine details by conditioning fusion on camera pose and handles occlusions via estimating an initial scene geometry to prevent projecting image features into occluded regions. Occluded regions are obtained if one object blocks another, from the angle from which the camera is shooting, then some areas may not be visible (specifically on video frames). The combination of these tricks allows achieving state-of-the-art reconstruction quality.

B. Datasets

Trained is the proposed method on ScanNet, which contains 1613 indoor scenes with ground-truth camera poses, 3D reconstructions, and segmentation labels. Overall, there are 2.5M RGB-D frames acquired in 707 distinct spaces. Adopted are the standard splits and report results for the test subset. Also evaluated is the quality of transferring the base neural networks trained on ScanNet to other datasets: TUM RGB-D, a longstanding RGB-D SLAM benchmark; ICL-NUIM, a small-scale RGBD reconstruction benchmark with eight scenes rendered in a synthetic framework and 7-Scenes, a small yet challenging indoor RGB-D dataset comprising 7 real-world indoor spaces.

C. Evaluation Protocol

For each frame, a ground truth depth map is rendered from the ground truth mesh w.r.t. the corresponding camera pose. Similarly, an estimated depth map is rendered from the estimated mesh, and masked in regions where ground truth depth is invalid. All masked estimated depth maps are integrated into a single TSDF volume.

In all experiments, the reconstruction quality is assessed with the standard reference-based reconstruction metrics: accuracy, completeness, precision, recall, and F-score with a threshold of 5 cm; compared is the mesh obtained from masked estimated depths with the ground truth one.

TABLE I: Reconstruction quality of baseline and modified methods on ScanNet. The best scores are marked bold.

TABLE 1

| Method | Acc↓ | Comp↓ | Prec↑ | Recall↑ | F-score↑ |
|---|---|---|---|---|---|
| Atlas | 0.068 | 0.098 | 0.640 | 0.539 | 0.583 |
| Atlas + NSR | 0.067 | 0.082 | 0.652 | 0.566 | 0.604 |
| VoRTX | 0.054 | 0.090 | 0.708 | 0.588 | 0.641 |
| VoRTX + NSR | 0.051 | 0.083 | 0.718 | 0.608 | 0.657 |

Acc—accuracy—the average distance from the points of the predicted 3D model to the nearest points of the ground truth model Comp—completeness—the average distance from the ground truth points of the 3D model to the nearest points of the predicted model Prec—precision—Percentage of predicted 3D model points for which the distance to the nearest point from the ground truth model is less than 5 cm Recall—Percentage of ground truth model points for which the distance to the nearest point from the predicted 3D model is less than 5 cm F-score—harmonic mean of Precision and Recall The arrows indicate which value is better (down arrow—the smaller the better, the up arrow—the more the better)

Conclusions: For both methods (Atlas, Vortx), the addition of NSR regularization improves the quality in all metrics.

TABLE II: Reconstruction quality of VoRTX baseline and modified method trained on ScanNet, on ICL-NUIM, TUM RGB-D, and 7Scenes datasets. The best scores for each dataset are marked bold.

TABLE II

| Dataset | Method | Acc↓ | Comp↓ | Prec↑ | Recall↑ | F-score↑ |
|---|---|---|---|---|---|---|
| ICL-NUIM | VoRTX | 0.102 | 0.146 | 0.449 | 0.375 | 0.408 |
| | VoRTX + NSR | 0.094 | 0.262 | 0.526 | 0.378 | 0.439 |
| TUM RGB-D | VoRTX | 0.175 | 0.056 | 0.502 | 0.642 | 0.551 |
| | VoRTX + NSR | 0.190 | 0.052 | 0.512 | 0.660 | 0.564 |
| 7Scenes | VoRTX | 0.118 | 0.298 | 0.331 | 0.227 | 0.266 |
| | VoRTX + NSR | 0.118 | 0.289 | 0.334 | 0.234 | 0.272 |

Conclusions: When transferring the base neural network trained on one dataset to other data, adding NSR regularization also gives an increase in quality for almost all metrics (tested on 3 datasets: ICL-NUIM, TUM RGB-D, 7Scenes)

D. Inference

During inference, sample K=60 keyframes are taken randomly, so that for each pair of consecutive keyframes, the relative rotation is at least 15° and translation is at least 10 cm. The sampled keyframes are used to estimate TSDF of an entire scene; the resulting scene mesh is derived from TSDF via the marching cubes algorithm.

The choice of key frames is done at the very initial stage, even before the data is fed into the neural network. This is done in order to reduce the time and memory costs of the algorithm (not all frames in a row are processed, but only key ones, because if the frames are very close to each other (taken from similar camera positions), then the information in them is duplicated and redundant).

The Marching Cubes algorithm is applied at the final stage to the results of the base neural network (the base neural network returns a TSDF for the entire scene, and Marching Cubes makes a point cloud or mesh from this TSDF.

E. Implementation Details

The proposed segmentation head (block 4 in FIG. 1B) is trained from scratch the same number of epochs as the base neural network. Used is the Adam optimizer with the standard initial learning rate 0.001.

Implemented is the proposed method with PyTorch framework and train the proposed network on one NVIDIA Tesla P40 GPU.

Used are camera intrinsic and extrinsic provided in datasets [8-11], adjusting them along with the image scaling. Following, the camera poses are initialized in a unit sphere and represent the initial SDF as a unit sphere with the surface normals pointing inside.

V. Results

A. Comparison to Prior Work

The reconstruction metrics on ScanNet are gathered in Table I, while the quality of 3D model transfer to ICL-NUIM, TUM RGB-D, and 7Scenes benchmarks are shown in Table II.

Table III illustrates reconstruction quality obtained using different loss combinations on ScanNet. "C" stands for conventional losses, "N"—for losses on normals, "NS"—for normal-segmentation losses.

TABLE III

| Method | Losses | | | Acc↓ | Comp↓ | Prec↑ | Recall↑ | F-score↑ |
|---|---|---|---|---|---|---|---|---|
| | N | NS | C | | | | | |
| VoRTX | – | – | – | 0.054 | 0.090 | 0.708 | 0.588 | 0.641 |
| VoRTX | + | – | – | 0.051 | 0.086 | 0.707 | 0.593 | 0.644 |
| VoRTX | + | + | – | 0.053 | 0.082 | 0.707 | 0.599 | 0.647 |
| VoRTX + NSR | + | + | + | 0.051 | 0.083 | 0.718 | 0.608 | 0.657 |

Conclusions: adding separate terms to the common loss function improves the quality of the 3D model, and the best results can be achieved by adding all the modifications proposed in the disclosure (both loss functions for normals, and for segmentation, and classical normal losses).

Figure 2:
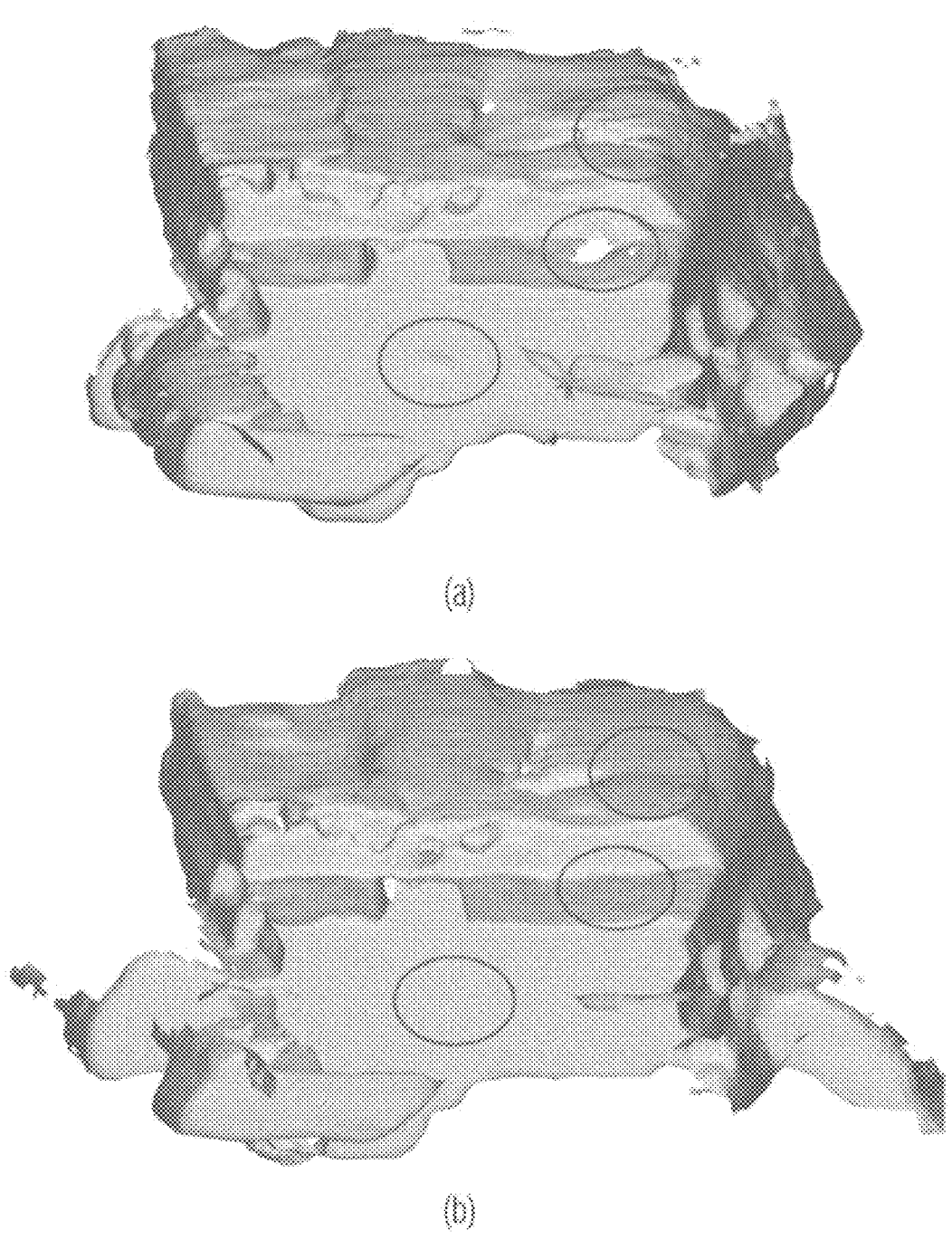
FIG. 2 illustrates visualization of 3D scenes reconstructed with origin VoRTX and VoRTX+NSR obtained with original VoRTX (a) and the proposed VoRTX+NSR (b).

The visualization of the results of 3D reconstruction are depicted in FIG. 2. FIG. 2 illustrates the visualization of 3D reconstructions obtained with original VoRTX (a) and VoRTX+NSR (b). The table shows that adding NSR to the base method noticeably improves quality. The problematic areas are zoomed to highlight the benefits of using NSR. As can be seen, the proposed modification allows filling in the holes in the planar surfaces, while baseline approaches provide incomplete reconstruction with missing points in these areas. Moreover, opposite to baselines, NSR encourages walls and floor to be smooth and planar.

Analyzed is the effect of applying each component of NSR on the reconstruction quality. All ablation studies are conducted with VoRTX as a baseline, and the same training/evaluation protocols as described above, unless stated otherwise. First, examined is the quality of estimated segmentations by utilizing ground truth segmentation annotations instead of predicted ones.

Then, examined are base neural networks trained with different combinations of conventional normal and normal-segmentation losses to ensure that reconstruction quality benefits from using proposed losses.

Thus, proposed is are NSR, a modification of scene reconstruction methods, which allows considering the typical scene structure. Specifically, the proposed modification determines walls and floor in a point cloud, and penalizes the corresponding surface normals for divergence from horizontal and vertical directions, respectively. Implemented as a 3D sparse convolutional module, NSR can be incorporated into an arbitrary trainable pipeline that outputs TSDF, and be trained end-to-end on 3D segmentation point clouds. During inference, 3D segmentations is not needed, so using NSR does not impose any restrictions on usage scenarios. Applied is the proposed modification to several state of-the-art TSDF reconstruction methods, and demonstrate a solid performance gain on the standard benchmarks: ScanNet, ICL-NUIM, and TUM RGB-D.

FIG. 3 illustrates a process flow depicting a method for 3D reconstruction and visualization, according to an embodiment of the present disclosure.

According to FIG. 3, a method 300 for 3D scene reconstruction and visualization using at least one processor is provided.

According to an embodiment of the disclosure, the method may comprise obtaining S302 a trained base neural network by training the base neural network for obtaining distance information for voxels of a real scene.

In an embodiment, the method may comprise operating S304 the trained base neural network for obtaining the distance information of an input sequence of frames of the real scene.

According to an embodiment of the disclosure, the method may comprise inputting S306 the distance information to an algorithm that outputs a 3D reconstruction of the real scene.

According to an embodiment of the disclosure, the method may comprise obtaining S308 a 3D visualization of the real scene by rendering the 3D reconstruction of the real scene.

According to an embodiment of the disclosure, the method may comprise instructing S310 at least one display to display the 3D visualization of the real scene.

According to an embodiment of the disclosure, the method may comprise inputting training data of a training scene.

According to an embodiment of the disclosure, the method may comprise including a training sequence of RGB (Red, Green, Blue) frames with corresponding camera pose data, into a backbone of the base neural network.

According to an embodiment of the disclosure, the method may comprise computing TSDF (Truncated Signed Distance Function) losses between a TSDF prediction, obtained by a TSDF head of the base neural network from data output from the backbone, and a ground truth scan According to an embodiment of the disclosure, the method may comprise deriving, by a segmentation head of the base neural network from the data output from the backbone, a segmentation prediction defining floor areas, wall areas, and other areas for each training voxel in the training scene According to an embodiment of the disclosure, the method may comprise computing segmentation losses between the segmentation prediction and a segmentation ground truth According to an embodiment of the disclosure, the method may comprise computing normal coordinates as gradients of the TSDF prediction of TSDF values in each training voxel According to an embodiment of the disclosure, the method may comprise computing conventional normal losses for normals for the wall areas and floor areas based on gradients of TSDF for the ground truth scan and gradients of the TSDF prediction According to an embodiment of the disclosure, the method may comprise computing a common loss function as a sum of the TSDF losses, the segmentation losses, the conventional normal losses According to an embodiment of the disclosure, the method may comprise minimizing the common loss function to obtain a minimized common loss function.

According to an embodiment of the disclosure, the segmentation head and TSDF head are used in parallel while training.

According to an embodiment of the disclosure, the method may comprise selecting wall normal vectors in the wall areas and computing vertical components of the wall normal vectors.

According to an embodiment of the disclosure, the method may comprise selecting floor normal vectors in the floor areas and computing horizontal components of the floor normal vectors.

According to an embodiment of the disclosure, the method may comprise obtaining, at each point in the wall areas, the vertical components of wall normal vectors.

According to an embodiment of the disclosure, the method may comprise obtaining, at each point in the floor areas, the horizontal components of the floor normal vectors and x- and y-components of the floor normal vectors.

According to an embodiment of the disclosure, the method may comprise computing the conventional normal losses by using lengths of z-components of the wall normal vectors, normals of two-dimensional vectors composed of the x- and y-components.

According to an embodiment of the disclosure, the 3D reconstruction of the real scene comprises a point cloud or triangle mesh.

According to an embodiment of the disclosure, the method may comprise minimizing the common loss function by computing a gradient of the common loss function over parameters of the base neural network.

According to an embodiment of the disclosure, the method may comprise updating parameters of the base neural network by providing backpropagation of the minimized common loss function and updating the parameters of the base neural network according to the minimized common loss function.

According to an embodiment of the disclosure, the method may comprise minimizing the loss function repeatedly until the common loss function stops decreasing.

According to an embodiment of the disclosure, the method may comprise minimizing the loss function repeatedly until the common loss function reaches a preset threshold value.

According to an embodiment of the disclosure, an electronic device for 3D scene reconstruction and visualization, the electronic device comprising: at least one display, at least one memory configured to store instructions, and at least one processor.

According to an embodiment of the disclosure, the at least one processor is configured to execute the instructions to obtain a trained base neural network by training the base neural network for obtaining distance information for voxels of a real scene.

According to an embodiment of the disclosure, the at least one processor is configured to execute the instructions to operate the trained base neural network for obtaining the distance information of an input sequence of frames of the real scene.

According to an embodiment of the disclosure, the at least one processor is configured to execute the instructions to input the distance information to an algorithm that outputs a 3D reconstruction of the real scene.

According to an embodiment of the disclosure, the at least one processor is configured to execute the instructions to obtain a 3D visualization of the real scene by rendering the 3D reconstruction of the real scene.

According to an embodiment of the disclosure, the at least one processor is configured to execute the instructions to instruct the at least one display to display the 3D visualization of the real scene.

According to an embodiment of the disclosure, the at least one processor is configured to execute the instructions to input training data of a training scene, including a training sequence of RGB (Red, Green, Blue) frames with corresponding camera pose data, into a backbone of the base neural network.

According to an embodiment of the disclosure, the at least one processor is configured to execute the instructions to compute TSDF (Truncated Signed Distance Function) losses between a TSDF prediction, obtained by a TSDF head of the base neural network from data output from the backbone, and a ground truth scan.

According to an embodiment of the disclosure, the at least one processor is configured to execute the instructions to derive, by a segmentation head of the base neural network from the data output from the backbone, a segmentation prediction defining floor areas, wall areas, and other areas for each training voxel in the training scene.

According to an embodiment of the disclosure, the at least one processor is configured to execute the instructions to compute segmentation losses between the segmentation prediction and a segmentation ground truth.

According to an embodiment of the disclosure, the at least one processor is configured to execute the instructions to compute normal coordinates as gradients of the TSDF prediction of TSDF values in each training voxel.

According to an embodiment of the disclosure, the at least one processor is configured to execute the instructions to compute conventional normal losses for normals for the wall areas and floor areas based on gradients of TSDF for the ground truth scan and gradients of the TSDF prediction.

According to an embodiment of the disclosure, the at least one processor is configured to execute the instructions to compute a common loss function as a sum of the TSDF losses, the segmentation losses, the conventional normal losses.

According to an embodiment of the disclosure, the at least one processor is configured to execute the instructions to minimize the common loss function to obtain a minimized common loss function.

According to an embodiment of the disclosure, the at least one processor is configured to execute the instructions to select wall normal vectors in the wall areas and computing vertical components of the wall normal vectors.

According to an embodiment of the disclosure, the at least one processor is configured to execute the instructions to select floor normal vectors in the floor areas and computing horizontal components of the floor normal vectors.

According to an embodiment of the disclosure, the at least one processor is configured to execute the instructions to obtain, at each point in the wall areas, the vertical components of wall normal vectors.

According to an embodiment of the disclosure, the at least one processor is configured to execute the instructions to obtain, at each point in the floor areas, the horizontal components of the floor normal vectors and x- and y-components of the floor normal vectors.

According to an embodiment of the disclosure, the at least one processor is configured to execute the instructions to compute the conventional normal losses by using lengths of z-components of the wall normal vectors, normals of two-dimensional vectors composed of the x- and y-components.

According to an embodiment of the disclosure, the at least one processor is configured to execute the instructions to minimize the common loss function by computing a gradient of the common loss function over parameters of the base neural network.

According to an embodiment of the disclosure, the at least one processor is configured to execute the instructions to update parameters of the base neural network by providing backpropagation of the minimized common loss function.

According to an embodiment of the disclosure, the at least one processor is configured to execute the instructions to update the parameters of the base neural network according to the minimized common loss function.

According to an embodiment of the disclosure, the at least one processor is configured to execute the instructions to minimize the common loss function repeatedly until the common loss function stops decreasing.

Provided are methods and computer-readable media for 3D scene reconstruction and visualization.

According to an aspect of the disclosure, a method for 3D scene reconstruction and visualization, using a neural network having a base neural network, having a backbone and a TSDF (Truncated Signed Distance Function) head, and a segmentation head, the method includes, using at least one processor: obtaining a trained base neural network by training the base neural network for obtaining a TSDF volume for voxels of a real scene, by performing training operations of: inputting training data of a training scene, including a training sequence of RGB (Red, Green, Blue) frames with corresponding camera pose data, into the backbone; computing TSDF losses between a TSDF prediction, obtained by the TSDF head from data output from the backbone, and a ground truth scan; deriving, by the segmentation head from the data output from the backbone, a segmentation prediction defining floor areas, wall areas, and other areas for each training voxel in the training scene; computing segmentation losses between the segmentation prediction and a segmentation ground truth; computing normal coordinates as gradients of the TSDF prediction of TSDF values in each training voxel; computing conventional normal losses for normals for the wall areas and floor areas based on gradients of TSDF for the ground truth scan and gradients of the TSDF prediction; computing a common loss function as a sum of the TSDF losses, the segmentation losses, the conventional normal losses; and minimizing the common loss function to obtain a minimized common loss function. The method further includes operating the trained base neural network for obtaining the TSDF volume of an input sequence of RGB frames of the real scene; applying, to the TSDF volume, an algorithm that calculates a 3D reconstruction of the real scene; rendering the 3D scene reconstruction for obtaining a 3D visualization of the real scene; and instructing at least one display to display the 3D visualization of the real scene.

The algorithm, that calculates 3D scene reconstruction, may be a Marching Cubes algorithm.

The segmentation head and TSDF head may be used in parallel while training.

The method may include, after the computing normal coordinates: selecting wall normal vectors in the wall areas and computing vertical components of the wall normal vectors; and selecting floor normal vectors in the floor areas and computing horizontal components of the floor normal vectors.

The computing conventional normal losses may include: at each point in the wall areas, the vertical components of wall normal vectors are obtained, and lengths of z-components of the wall normal vectors are added to the conventional normal losses, and at each point in the floor areas, the horizontal components of the floor normal vectors and x- and y-components of the floor normal vectors are obtained, and normals of two-dimensional vectors composed of the x- and y-components are added to the conventional normal losses.

The 3D reconstruction of the real scene may comprise a point cloud or triangle mesh.

Minimizing of the common loss function may be implemented by computing a gradient of the common loss function over parameters of the base neural network.

The method may include updating parameters of the base neural network by providing backpropagation of the minimized common loss function and updating the parameters of the base neural network according to the minimized common loss function.

The training operations may be repeated until the common loss function stops decreasing.

The training operations may be repeated until the common loss function reaches a preset threshold value.

According to an aspect of the disclosure, a non-transitory computer-readable medium storing program instructions that when executed by at least one processor, cause the at least one processor to perform: obtaining a trained base neural network by training a base neural network for obtaining a TSDF (Truncated Signed Distance Function) volume for voxels of a real scene, by performing training operations of: inputting training data of a training scene, including a training sequence of RGB (Red, Green, Blue) frames with corresponding camera pose data, into a backbone of the base neural network; computing TSDF losses between a TSDF prediction, obtained by a TSDF head of the base neural network from data output from the backbone, and a ground truth scan; deriving, by a segmentation head from the data output from the backbone, a segmentation prediction defining floor areas, wall areas, and other areas for each training voxel in the training scene; computing segmentation losses between the segmentation prediction and a segmentation ground truth; computing normal coordinates as gradients of the TSDF prediction of TSDF values in each training voxel; computing conventional normal losses for normals for the wall areas and floor areas based on gradients of TSDF for the ground truth scan and gradients of the TSDF prediction; computing a common loss function as a sum of the TSDF losses, the segmentation losses, the conventional normal losses; and minimizing the common loss function to obtain a minimized common loss function. The at least one processor may further perform operating the trained base neural network for obtaining the TSDF volume of an input sequence of RGB frames of the real scene; applying, to the TSDF volume, an algorithm that calculates a 3D reconstruction of the real scene; rendering the 3D scene reconstruction for obtaining a 3D visualization of the real scene; and instructing at least one display to display the 3D visualization of the real scene.

The algorithm, that calculates 3D scene reconstruction, may be a Marching Cubes algorithm.

The segmentation head and TSDF head may be used in parallel while training.

The program instructions may cause the at least one processor to perform, after the computing normal coordinates: selecting wall normal vectors in the wall areas and computing vertical components of the wall normal vectors; and selecting floor normal vectors in the floor areas and computing horizontal components of the floor normal vectors.

The computing conventional normal losses may include: at each point in the wall areas, the vertical components of the wall normal vectors are obtained, and lengths of z-components of the wall normal vectors are added to the conventional normal losses, and at each point in the floor areas, the horizontal components of the floor normal vectors and x- and y-components of the floor normal vectors are obtained, and normals of two-dimensional vectors composed of the x- and y-components are added to the conventional normal losses.

The 3D reconstruction of the real scene may be composed of a point cloud or triangle mesh.

Minimizing of the common loss function may be implemented by computing a gradient of the common loss function over parameters of the base neural network.

The program instructions may cause the at least one processor to perform updating parameters of the base neural network by providing backpropagation of the minimized common loss function and updating the parameters of the base neural network according to the minimized common loss function.

The training operations may be repeated until the common loss function stops decreasing.

The training operations may be repeated until the common loss function reaches a preset threshold value.

While the disclosure has been particularly shown and described with reference to embodiments thereof, it will be understood that various changes in form and details may be made therein without departing from the spirit and scope of the following claims.

The invention claimed is:

1. A method for 3D scene reconstruction and visualization, the method comprising, using at least one processor:

obtaining a trained base neural network by training the base neural network for obtaining distance information for voxels of a real scene;

operating the trained base neural network for obtaining the distance information of an input sequence of frames of the real scene;

inputting the distance information to an algorithm that outputs a 3D reconstruction of the real scene;

obtaining a 3D visualization of the real scene by rendering the 3D reconstruction of the real scene; and instructing at least one display to display the 3D visualization of the real scene, wherein the training the base neural network includes:

inputting training data of a training scene, including a training sequence of RGB (Red, Green, Blue) frames with corresponding camera pose data, into a backbone of the base neural network;

computing a common loss function as a sum of Truncated Signed Distance Function (TSDF) losses, segmentation losses, and normal losses; and minimizing the common loss function to obtain a minimized common loss function.

2. The method of claim 1, wherein the training the base neural network includes:

computing the TSDF losses between a TSDF prediction, obtained by a TSDF head of the base neural network from data output from the backbone, and a ground truth scan;

deriving, by a segmentation head of the base neural network from the data output from the backbone, a segmentation prediction defining floor areas, wall areas, and other areas for each training voxel in the training scene;

computing the segmentation losses between the segmentation prediction and a segmentation ground truth;

computing normal coordinates as gradients of the TSDF prediction of TSDF values in each training voxel;

computing the normal losses for normals for the wall areas and the floor areas based on gradients of TSDF for the ground truth scan and gradients of the TSDF prediction.

3. The method of claim 2, wherein the segmentation head and TSDF head are used in parallel while training.

4. The method of claim 2, wherein the minimizing the common loss function comprises:

minimizing the common loss function by computing a gradient of the common loss function over parameters of the base neural network.

5. The method of claim 2, further comprising updating parameters of the base neural network by providing backpropagation of the minimized common loss function and updating the parameters of the base neural network according to the minimized common loss function.

6. The method of claim 2, wherein the minimizing the common loss function comprises:

minimizing the common loss function repeatedly until the common loss function stops decreasing.

7. The method of claim 2, wherein the minimizing the common loss function comprises:

minimizing the common loss function repeatedly until the common loss function reaches a preset threshold value.

8. The method of claim 2, further comprising, after the computing normal coordinates:

selecting wall normal vectors in the wall areas and computing vertical components of the wall normal vectors; and selecting floor normal vectors in the floor areas and computing horizontal components of the floor normal vectors.

9. The method of claim 8, wherein the computing the normal losses comprises:

obtaining, at each point in the wall areas, the vertical components of wall normal vectors, obtaining, at each point in the floor areas, the horizontal components of the floor normal vectors and x- and y-components of the floor normal vectors, and computing the normal losses by using lengths of z-components of the wall normal vectors, normals of two-dimensional vectors composed of the x- and y-components.

10. The method of claim 1, wherein the 3D reconstruction of the real scene comprises a point cloud or triangle mesh.

11. A non-transitory computer-readable medium storing program instructions that when executed by at least one processor, cause the at least one processor of an electronic device to implement the method of claim 1.

12. An electronic device for 3D scene reconstruction and visualization, the electronic device comprising:

at least one display;

at least one memory configured to store instructions; and at least one processor configured to execute the instructions to:

obtain a trained base neural network by training the base neural network for obtaining distance information for voxels of a real scene;

operate the trained base neural network for obtaining the distance information of an input sequence of frames of the real scene;

input the distance information to an algorithm that outputs a 3D reconstruction of the real scene;

obtain a 3D visualization of the real scene by rendering the 3D reconstruction of the real scene; and instruct the at least one display to display the 3D visualization of the real scene, wherein the at least one processor is further configured to execute the instructions to:

input training data of a training scene, including a training sequence of RGB (Red, Green, Blue) frames with corresponding camera pose data, into a backbone of the base neural network;

compute a common loss function as a sum of Truncated Signed Distance Function (TSDF) losses, segmentation losses, and normal losses; and minimize the common loss function to obtain a minimized common loss function.

13. The electronic device of claim 12, wherein the at least one processor is further configured to:

compute the TSDF losses between a TSDF prediction, obtained by a TSDF head of the base neural network from data output from the backbone, and a ground truth scan, derive, by a segmentation head of the base neural network from the data output from the backbone, a segmentation prediction defining floor areas, wall areas, and other areas for each training voxel in the training scene, compute the segmentation losses between the segmentation prediction and a segmentation ground truth, compute normal coordinates as gradients of the TSDF prediction of TSDF values in each training voxel, compute the normal losses for normals for the wall areas and floor areas based on gradients of TSDF for the ground truth scan and gradients of the TSDF prediction.

14. The electronic device of claim 13, wherein the segmentation head and TSDF head are used in parallel while training.

15. The electronic device of claim 13, wherein the at least one processor is further configured to:

minimize the common loss function by computing a gradient of the common loss function over parameters of the base neural network.

16. The electronic device of claim 13, wherein the at least one processor is further configured to:

update parameters of the base neural network by providing backpropagation of the minimized common loss function, and update the parameters of the base neural network according to the minimized common loss function.

17. The electronic device of claim 13, wherein the at least one processor is further configured to:

minimize the common loss function repeatedly until the common loss function stops decreasing.

18. The electronic device of claim 12, wherein the at least one processor is further configured to:

select the wall normal vectors in the wall areas and compute vertical components of the wall normal vectors, and select floor normal vectors in the floor areas and compute horizontal components of the floor normal vectors.

19. The electronic device of claim 18, wherein the at least one processor is further configured to:

obtain, at each point in the wall areas, the vertical components of wall normal vectors, obtain, at each point in the floor areas, the horizontal components of the floor normal vectors and x- and y-components of the floor normal vectors, and compute the normal losses by using lengths of z-components of the wall normal vectors, normals of two-dimensional vectors composed of the x- and y-components.

20. The electronic device of claim 12, wherein the 3D reconstruction of the real scene comprises a point cloud or triangle mesh.

* * * * *